United States Patent [19]

Shimokasa

[11] Patent Number: 5,297,147
[45] Date of Patent: Mar. 22, 1994

[54] DATA COMPRESSION AND DECOMPRESSION CONTROLLING METHOD

[75] Inventor: Kiyoshi Shimokasa, Amagasaki, Japan

[73] Assignee: Mitsubishi Denki Kabushiki Kaisha, Tokyo, Japan

[21] Appl. No.: 832,906

[22] Filed: Feb. 7, 1992

[30] Foreign Application Priority Data

Feb. 8, 1991 [JP] Japan .................. 3-037860

[51] Int. Cl.⁵ .............................. H04J 15/00
[52] U.S. Cl. .................. 370/118; 370/100.1
[58] Field of Search ............. 370/100.1, 102, 105.4, 370/105.5, 106, 118, 109; 375/122, 112, 106, 114, 116; 381/29, 31; 382/56

[56] References Cited

U.S. PATENT DOCUMENTS

| | | | |
|---|---|---|---|
| 4,558,455 | 12/1985 | Epenoy et al. | 375/112 |
| 4,586,027 | 4/1986 | Tsukiyama et al. | 364/200 |
| 4,771,425 | 9/1988 | Baran et al. | 370/118 |
| 4,890,282 | 12/1989 | Lambert et al. | 370/118 |
| 4,903,261 | 2/1990 | Baran et al. | 370/94.2 |
| 5,123,013 | 6/1992 | Hirayama | 375/116 |

FOREIGN PATENT DOCUMENTS 58-191551 11/1983 Japan.
63-292900 11/1988 Japan.
63-314037 12/1988 Japan.

*Primary Examiner*—Benedict V. Safourek
*Assistant Examiner*—Ajit Patel
*Attorney, Agent, or Firm*—Rothwell, Figg, Ernst & Kurz

[57] ABSTRACT

A multiplexer adds synchronizing bits to receive data transmitted from a digital communication line to a digital private branch exchange, and checks for synchronizing bits in send data transmitted from the digital private branch exchange to the digital communication line. If the multiplexer detects synchronizing bits, it switches to a non-compression mode in which it transmits selected bits of send data without compression, and transmits receive data without decompression but with addition of synchronizing bits.

13 Claims, 8 Drawing Sheets

DATA COMPRESSION AND DECOMPRESSION CONTROLLING METHOD

BACKGROUND OF THE INVENTION

This invention relates to a method of determining whether to compress data transmitted from a digital private branch exchange (hereinafter, PBX) to a digital communication line, and whether to decompress data transmitted from the digital communication line to the digital PBX. The invented method is suitable for use, for example, by a multimedia multiplexer in transmitting PCM audio data.

Large corporations and other entities with sites at diverse locations often construct in-house communication networks comprising nodes linked via high-speed digital communication lines leased from a common carrier. Switching at each node is performed by a digital PBX.

Increasingly, such networks are used for multimedia purposes, carrying both telephone conversations and other types of information such as video images and computer data. The PBXs are then connected to the leased communication lines through multimedia multiplexers. To enable the leased lines to carry more information, a multimedia multiplexer usually compresses audio and video data when sending such data on the line, the data being decompressed by the multimedia multiplexer at the receiving end of the line.

To avoid excessive distortion, it is preferable that the compression and decompression processes be performed only at the originating and destination nodes, not at any intermediate nodes through which the data may be routed. Since a PBX is capable of determining whether it is at an originating, destination, or intermediate node, a prior-art scheme was to have each PBX notify its connected multimedia multiplexers whether compression and decompression were required or not.

Methods of passing compress and non-compress commands from a PBX to a multimedia multiplexer have not been standardized, however, so when the prior-art scheme is adopted, it restricts the selection of PBX equipment. That is, the PBXs must have a non-standard feature for sending such commands, and must use particular commands understood by the multimedia multiplexers. In addition to limiting the range of selection, these restrictions tend to raise the cost of building a network by preventing the use of inexpensive PBX equipment without such special features.

SUMMARY OF THE INVENTION

An object of the present invention is accordingly to enable multimedia multiplexers in a digital communication network to determine by themselves when compression and decompression are required, without having to be notified by connected PBXs.

To determine whether to compress send data transmitted from a digital PBX to a digital communication line and decompress receive data transmitted from the digital communication line to the digital PBX, a multimedia multiplexer adds a certain pattern of synchronizing bits to receive data, and checks for the pattern of synchronizing bits in send data. If the multimedia multiplexer detects the pattern of synchronizing bits, it switches to a non-compression mode in which it transmits selected bits of send data without compression, and transmits receive data without decompression but with addition of synchronizing bits.

DETAILED DESCRIPTION OF THE INVENTION

Several embodiments will be described with reference to the drawings, which illustrate applications of the invention to networks employing various types of interfaces between digital PBXs and multimedia multiplexers. The drawings do not limit the scope of the invention, which should be determined solely from the appended claims.

All embodiments will be described in relation to the network shown in FIG. 1. This network has nodes A, B, and C comprising digital PBXs $1a$, $1b$, and $1c$, which are interconnected through multimedia multiplexers $2a$, $2b_1$, $2b_2$, and $2c$ and digital communication lines 3. Interfaces 4 between the digital PBX $1a$ and the multimedia multiplexer $2a$, between the digital PBX $1b$ and the multimedia multiplexers $2b_1$ and $2b_2$, and between the digital PBX $1c$ and the multimedia multiplexer $2c$ employ a standard interface, examples of which will be described later. Terminals such as telephone sets $5a$, $5b$, and $5c$ are connected to the digital PBXs $1a$, $1b$, and $1c$.

The digital PBXs $1a$ and $1c$ and multimedia multiplexers $2a$ to $2c$ employ time-division multiplexing to transmit a plurality of channels on each of the interfaces 4 and digital communication lines 3. On channels used for audio links between two telephone sets, the multimedia multiplexers $2a$ to $2c$ also perform compression and decompression functions: data transmitted at a high rate such as 64 kbps on the interfaces 4 are compressed for transmission at a lower rate such as 16 kbps on the digital communication lines 3.

In a call between the telephone sets $5a$ and $5c$, for example, transmission of data from node A to node C takes place as follows. The digital PBX $1a$ sends the multimedia multiplexer $2a$ a 64-kbps data stream representing an audio signal encoded by pulse-code modulation (PCM). Using a 4:1 compression algorithm, the multimedia multiplexer $2a$ encodes the 64-kbps PCM audio data to a 16-kbps data stream which it sends on the digital communication line 3 to the multimedia multiplexer $2b_1$.

To avoid unnecessary distortion, this 16-kbps data stream is not decompressed and recompressed at node B. In passing the received 16-kbps data to the digital PBX 1b, the multimedia multiplexer 2b₁ simply adds extra bits such as dummy bits to raise the data rate to 64 kbps. The multimedia multiplexer 2b₂ receives this 64-kbps data stream from the PBX 1b, ignores the dummy bits, and sends the unaltered 16-kbps data on the digital communication line 3 to the multimedia multiplexer 2c at node C.

The multimedia multiplexer 2c now uses a 1:4 decompression algorithm to decode the 16-kbps data to 64-kbps PCM audio data, which it sends to the PBX 1c. Audio quality is maintained at a high level because compression and decompression are performed only once each: compression at node A, and decompression at node C.

The invention relates to the method by which the multimedia multiplexers 2a, 2b₁, 2b₂, and 2c know whether to compress and decompress the data they send and receive. The first embodiment to be described is suited for a standard two-megabit-per-second (2-Mbps) interface between a digital PBX and a multimedia multiplexer specified by the Telecommunication Technology Committee (TTC).

Figure 2:
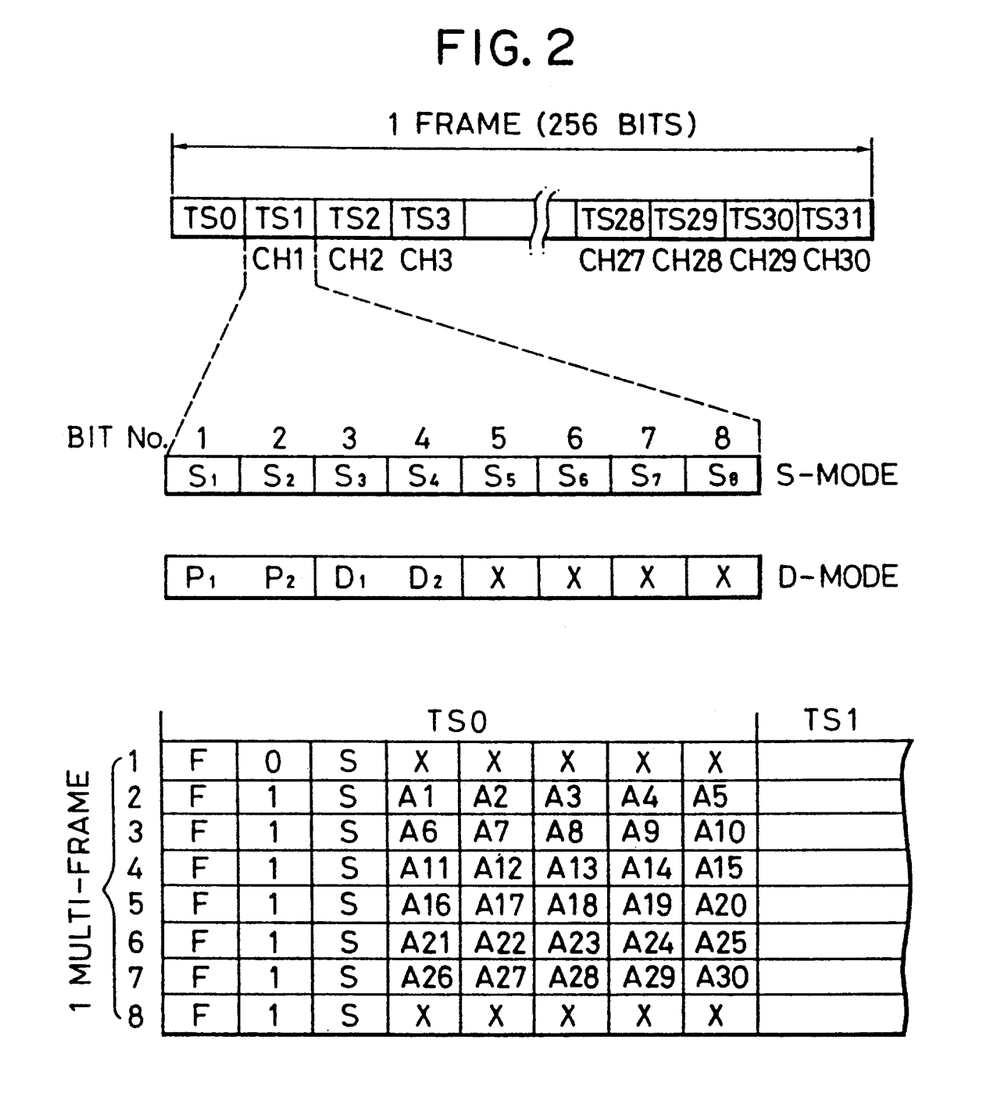
FIG. 2 is a frame diagram illustrating an embodiment of the invention for a standard 2-Mbps interface between a multimedia multiplexer and digital PBX.

Referring to FIG. 2, this interface uses a 256-bit frame comprising thirty-two time slots TS0 to TS31, each consisting of eight bits. Time slot TS0 is used as a common channel for signaling between PBXs. Time slots TS1 to TS15 and TS17 to TS30 are used as data channels, numbered CH1 to CH30 in the drawing. Time slot TS16 is not used. The frames are grouped into multi-frames consisting of eight frames each.

The well-known code-mark-inversion (CMI) line code is employed for transmissions between the digital PBX and multimedia multiplexer. The data rate is 2 Mbps: eight thousand frames are sent or received per second, each frame lasting 125 microseconds.

Time slot TS0, shown at the bottom of FIG. 2, comprises a frame-synchronizing bit (F) in which a code-rule violation is intentionally performed to indicate the beginning of a frame. This is followed by a multi-frame synchronizing bit which has the value zero in the first frame of a multi-frame and the value one in the second through eighth frames. Next comes a shutdown bit (S) which the PBX uses to notify the multimedia multiplexer of stoppage of data transmission.

In the second through seventh frames, the remaining five bits of time slot TS0 are signaling bits ($A_1$ to $A_{30}$), one signaling bit being assigned to each data channel. These signaling bits are used to transmit activating, address, and other signals described later.

In the first and eighth frames of a multi-frame, the usage of the remaining five bits (X) of TS0 is not specified. It is these bits that were employed in the prior art to have a digital PBX instruct a multimedia multiplexer whether to compress and decompress data, resulting in the disadvantage of incompatibility between, for example, a digital PBX from one manufacturer and a multimedia multiplexer from a different manufacturer. The present invention does not employ these bits.

Next the usage of the data channels in time slots TS1 to TS15 and TS17 to TS31 will be described.

In this embodiment, a multimedia multiplexer transmits data in one of two modes: a compression mode, referred to below as S-mode; and a non-compression mode, referred to below as D-mode. The corresponding bit configurations are shown in the middle of FIG. 2 for the data channel in time slot TS1, the other data channels being similar.

In S-mode, a time slot contains eight-bit PCM audio data ($S_1$ to $S_8$). Receiving these eight bits from the digital PBX, the multimedia multiplexer uses an encoding algorithm that compresses them to two data bits, which it sends on the digital communication line. Receiving two data bits from the digital communication line, the multimedia multiplexer employs a decoding algorithm that expands the two bits to eight PCM audio data bits, which it sends to the digital PBX.

In D-mode, a time slot contains two synchronizing bits ($P_1$ and $P_2$), two data bits ($D_1$ and $D_2$), and four dummy bits (X). Receiving these eight bits from the digital PBX, the multimedia multiplexer selects the two data bits ($D_1$, $D_2$) and sends them without alteration on the digital communication line. Receiving two data bits from the digital communication line, the multimedia multiplexer adds two synchronizing bits ($P_1$, $P_2$) and four dummy bits (X) and sends the resulting eight bits to the digital PBX. The synchronizing bits have a certain pattern that does not occur in PCM audio data during call setup. For instance, synchronizing bits $P_1$ and $P_2$ in a plurality of frames in combination form a certain predetermined pattern. Stated in reverse, if the bits at the bit positions for the synchronizing bits $P_1$ and $P_2$ in the plurality of frames in combination form the predetermined pattern, the presence of a synchronizing bit pattern is recognized. Since lower-order bits are less liable to discernible noise, the synchronizing and data bits are assigned the lowest possible bit positions, in this case the first to fourth bit positions.

Figure 1:
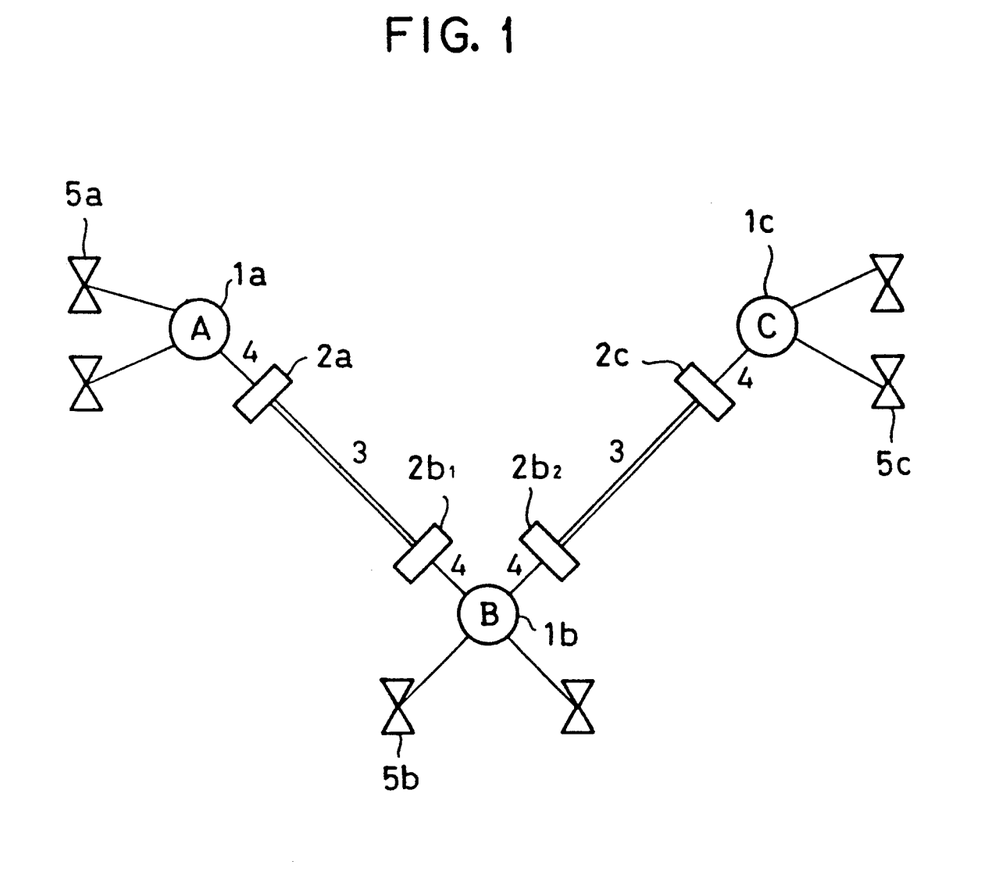
FIG. 1 is a network diagram illustrating originating, intermediate, and destination nodes.

In both S-mode and D-mode, the eight bits in a data channel on an interface 4 in FIG. 1 are reduced to two bits on the digital communication line 3. Thus the multimedia multiplexer converts between a 64-kbps-per-channel data rate on the interface 4 and 16-kbps-per-channel data rate on the digital communication line 3. Data rate conversion is not performed for the common signaling channel in time slot TS0.

Next the operation of this embodiment will be explained for a telephone call from the telephone set 5a at node A in FIG. 1 to the telephone set 5c at node C, the call being switched through the digital PBX 1b at node B.

Figure 3:
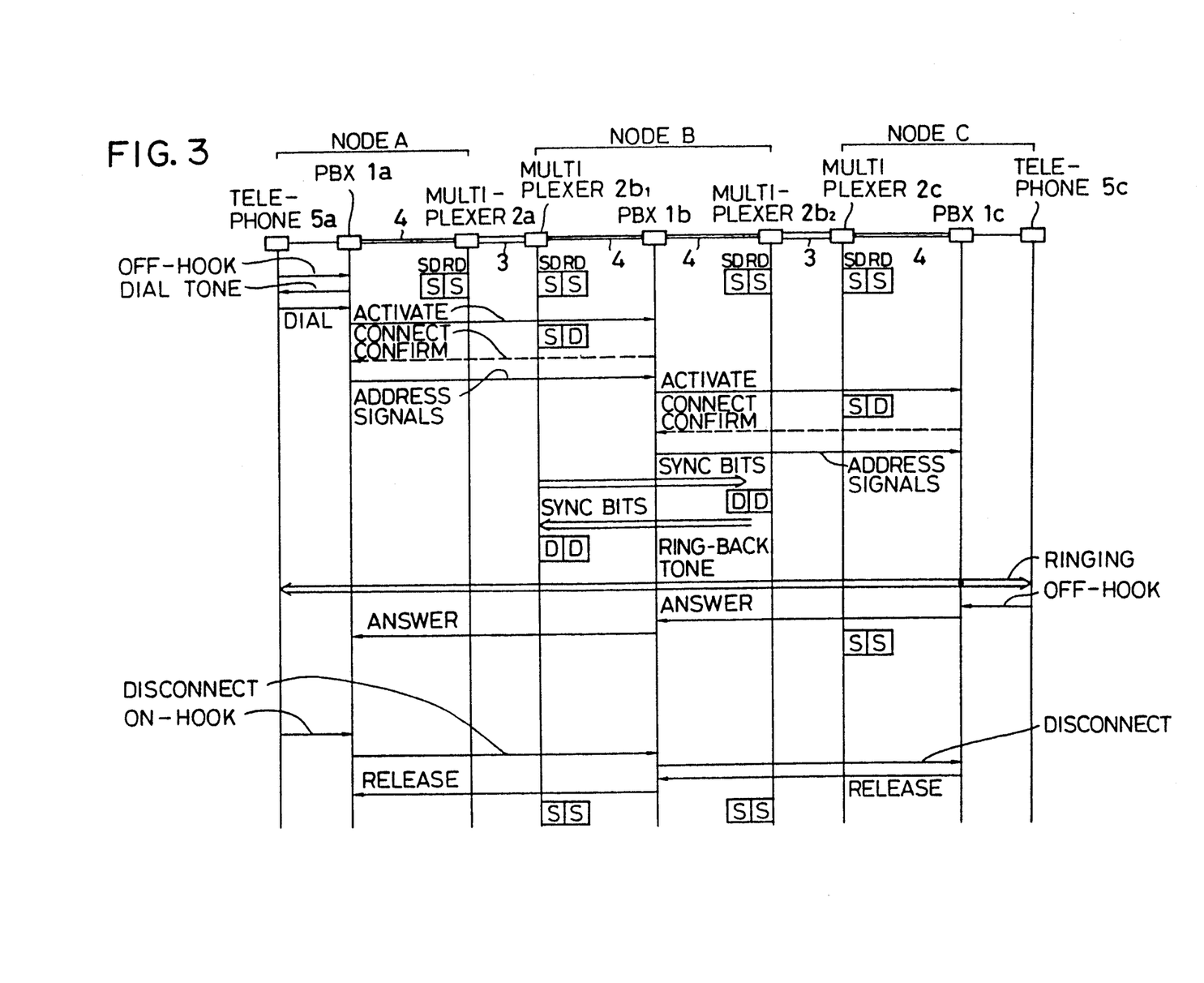
FIG. 3 is a sequence diagram showing the operation of the embodiment illustrated in FIG. 2.

Referring to FIG. 3, the letters S and D in the boxes SD and RD indicate the operating modes of the multimedia multiplexers. SD stands for send data, referring to data transmitted from a digital PBX to a digital communication line. RD stands for receive data, referring to data transmitted from the digital communication line to the digital PBX. The default operating mode of the multimedia multiplexers (the operating mode when a call is not in progress) is compression mode; that is, S-mode for both sending and receiving, as indicated by the letters S in the SD and RD boxes at the top of FIG. 3.

The horizontal solid lines and dashed lines with arrowheads in FIG. 3 indicate signaling information sent from one digital PBX to another using the signaling bits $A_i$ (i=1 to 30) in time slot TS0 in FIG. 2. (The digital PBXs 1a to 1c are of the SS/SR type.) The double lines with arrowheads indicate information sent in a data channel such as the data channel ($S_1$ to $S_8$ or $D_1$ or $D_2$) in time slot TS1. The digital PBXs 1a to 1c are adapted to set up both incoming and outgoing paths for data channels without waiting for an answer from the called node.

When the originating telephone set 5a goes off-hook and dials the telephone number of the telephone set 5c, the digital PBX 1a at node A sends an activating signal in signaling bits Ai in time slot TS0 through the multimedia multiplexers 2a and $2b_1$ to the digital PBX 1b. Detecting the activating signal from the digital communication line 3, the multimedia multiplexer $2b_1$ at node B responds by changing its receive mode to D-mode. The multimedia multiplexer $2b1$ begins sending the synchronizing bit pattern in the bit positions $P_1$ and $P_2$ in time slot TSi. The digital PBX 1b at node B also detects the activating signal and responds by sending back a connect confirm signal in signaling bits Ai in time slot TS0. The digital PBX 1a now sends address signals in signaling bits Ai in time slot TS0, specifying the dialed telephone number.

Upon receiving the address signals, the digital PBX 1b at node B sends an activating signal through the multimedia multiplexers $2b_2$ and 2c to the digital PBX 1c at node C. The same process is repeated: the receive mode of the multimedia multiplexer 2c changes to D-mode, the digital PBX sends a connect confirm signal, and the digital PBX 1b sends address signals.

The multimedia multiplexers $2b_1$ and 2c are now in a mixed mode comprising S-mode for sending and D-mode for receiving. The multimedia multiplexers 2a and $2b_2$ are still in compression mode; that is, in S-mode for both sending and receiving. In both the mixed and compression modes, the multimedia multiplexers check for the presence of the synchronizing bit pattern before compressing send data. In the mixed mode, the multimedia multiplexers also check the signaling information for the presence of an answer signal, described below, by which the digital PBX indicates that the called party has gone off-hook.

At this point the digital PBX 1b performs a switching operation to establish a data path for transmitting receive data from the multimedia multiplexer $2b_1$ as send data to the multimedia multiplexer $2b_2$, and another data path for transmitting receive data from the multimedia multiplexer $2b_2$ as send data to the multimedia multiplexer $2b_1$. Thus the synchronizing bits added to receive data by the multimedia multiplexer $2b_1$ (which is in D-mode for receiving) are sent to the multimedia multiplexer $2b_2$.

Upon recognizing the synchronizing bit pattern, the multimedia multiplexer $2b_2$ changes to non-compression mode; that is, to D-mode for both sending and receiving. Being in non-compression mode, the multimedia multiplexer $2b_2$ now adds synchronizing bits to the receive data it transfers through the digital PBX 1b to the multimedia multiplexer $2b_1$. Upon recognizing the synchronizing bit pattern, the multimedia multiplexer $2b_1$ also changes to non-compression mode (D-mode) for both sending and receiving. These mode transitions are preferably arranged to take place before the digital PBX 1c starts ringing the telephone set 5c at node C.

In addition to ringing the telephone set 5c, the digital PBX 1c sends a ring-back tone to node A. The multimedia multiplexer 2c is still operating in S-mode for sending, so it compresses the ring-back tone data. The multimedia multiplexers $2b_2$ and $2b_1$ at node B are now in D-mode, so they transmit the compressed data transparently without decompression or compression. The multimedia multiplexer 2a at node A, which is still in S-mode, decompresses the data. The ring-back tone is thus heard without noticeable distortion at the telephone set 5a, having been compressed and decompressed only once.

When the called telephone set 5c goes off-hook, the digital PBX 1c sends an answer signal, using signaling bits Ai in time slot TS0 in FIG. 2. Upon detecting the answer signal from the digital PBX 1c, the multimedia multiplexer 2c changes to compression mode; that is, to S-mode for both sending and receiving.

The answer signal is relayed from the digital PBX 1b through the multimedia multiplexer $2b_1$ to the digital PBX 1a. Since the muitimedia multiplexer $2b_1$ has already changed to non-compression mode (D-mode) for both sending and receiving, it remains in that mode; the answer signal does not cause it to change back to compression mode.

The multimedia multiplexers 2a and 2c at the originating and destination nodes A and C are now operating in S-mode for both sending and receiving, while the multimedia multiplexer $2b_1$ and $2b_2$ at the intermediate mode B are operating in D-mode for both sending and receiving. The parties at the telephone sets 5a and 5c can therefore converse with negligible audio distortion, the audio data being compressed and decompressed only at the originating and destination nodes A and C. The intermediate node B is transparent to the call.

When the telephone set 5a or 5c goes on-hook, the digital PBXs 1a, 1b, and 1c send disconnect and release signals in signaling bits Ai in time slot TS0 to deactivate the channel. Upon detecting the release signals, the multimedia multiplexers $2b_1$ and $2b_2$ revert to the compression mode; that is, they change from D-mode to S-mode for both sending and receiving.

Since the mode transitions of the multimedia multiplexers are all performed in response to standard signaling from the digital PBXs (the activate, answer, and release signals), or to synchronizing bit patterns generated by the multimedia multiplexers themselves, the digital PBXs do not require special functions for controlling compression and decompression by the multimedia multiplexers. The network can therefore be constructed using standard, relatively inexpensive PBX equipment, of which a wide selection is available.

The invention is of course applicable to interfaces other than the 2-Mbps interface described above. Embodiments for two other interfaces will be described next.

Figure 4:
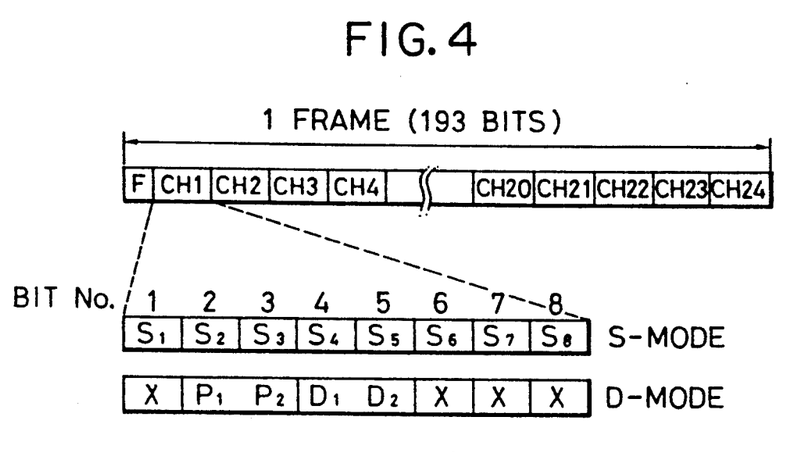
FIG. 4 is a frame diagram illustrating an embodiment of the invention for a T1 interface.

Referring to FIG. 4, the invention can also be applied when the familiar T1 format is used for the interface between the digital PBXs and multimedia multiplexers. In this format, a 193-bit frame is divided into twenty-four time slots with an additional F bit which can be used as a multi-framing bit, message bit, or line-error check bit. As before, eight thousand frames are sent per second, the data rate being 64 kbps per channel and 1.544 Mbps in all. The alternate-mark-inversion (AMI) line code is used.

This format lacks a special common-channel time slot for signaling, so a bit-stealing scheme is used in which signaling information is periodically inserted in the lowest-order bit position (bit 1) of each data channel. Since the value of this bit may be altered by the digital PBXx, it is assigned as a dummy bit in D-mode. The lowest other available bit positions are assigned for synchronizing and data: synchronizing bits $P_1$ and $P_2$ in bit positions two and three, data bits $D_1$ and $D_2$ in bit positions four and five.

This second embodiment also operates as illustrated in FIG. 3, so further description of the operation of this embodiment will be omitted.

Figure 5:
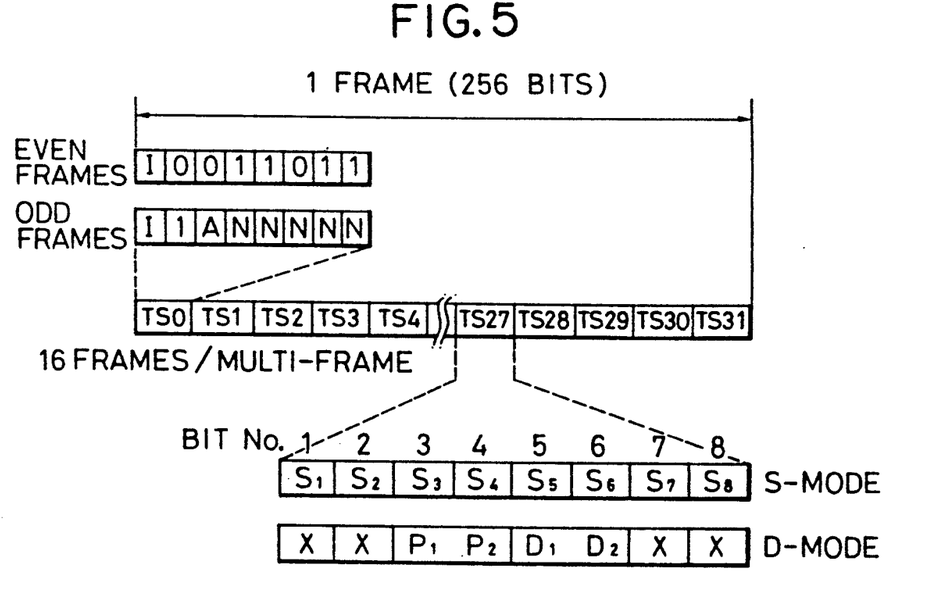
FIG. 5 is a frame diagram illustrating an embodiment of the invention for a CEPT interface.

Referring to FIG. 5, the invention is also applicable when the CEPT format is used on the interface between the digital PBXs and the multimedia multiplexers. In this format 256-bit frames are divided into thirty-two eight-bit time slots TS0 to TS31 and sent at a rate of eight thousand frames per second, using the AMI line code. A multi-framing scheme is used in which sixteen frames make up one multi-frame. Time slot TS0 is used for multi-framing control, and comprises an international bit (I), national bits (N), and an alarm bit (A).

In this third embodiment, in D-mode the two lowest-order bits (bits 1 and 2) are assigned as dummy bits and the next four bit positions are used for the synchronizing and data bits $P_1$, $P_2$, $D_1$, and $D_2$. The reason is that if the network also comprises interfaces of the 2-Mbps type described in FIG. 2, differences between A-law and μ-law analog/digital conversion may cause changes at the two lowest-order bit positions.

Aside from the different bit positions, the third embodiment illustrated in FIG. 5 operates like the second embodiment in FIG. 4. Further description will be omitted.

In the embodiments described so far, at the instant when the telephone set 5c goes off-hook, the multimedia multiplexer 2c at the destination node C is still receiving in D-mode, thus passing compressed PCM audio data to the digital PBX 1c with synchronizing and dummy bits added, instead of decompressing the data. As a result, the called party may hear noise at the very beginning of the call. In formats without common-channel signaling, there is also some chance that the noise will be misinterpreted by the digital PBX 1c as a disconnect signal.

Figure 6:
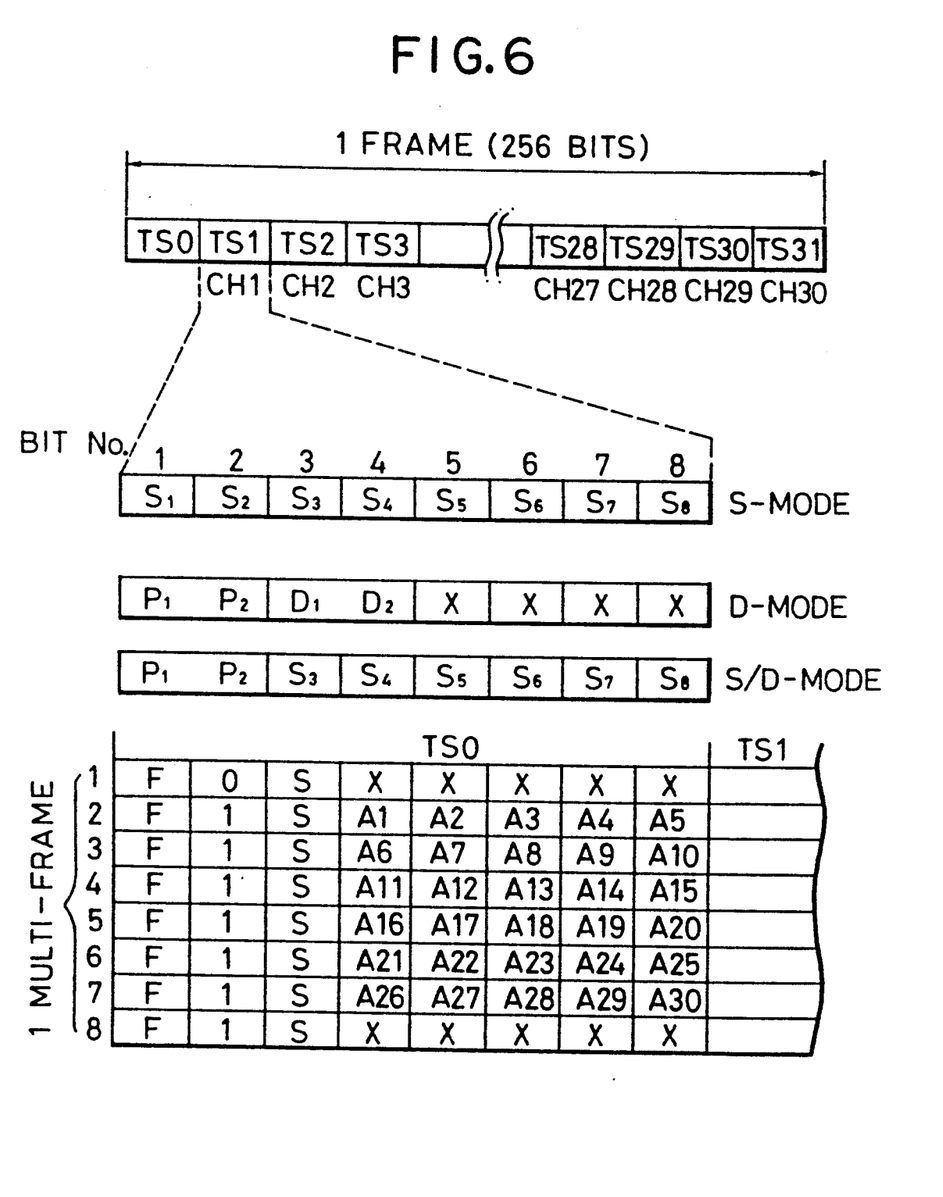
FIG. 6 is a frame diagram illustrating another embodiment for the 2-Mbps interface.

These difficulties are removed by a fourth embodiment illustrated in FIG. 6 for the 2-Mbps interface. In this embodiment, the mixed mode of the multimedia multiplexers comprises the S-mode for sending and an S/D-mode for receiving. In the S/D-mode a multimedia multiplexer decompresses the receive data as in S-mode, but substitutes synchronizing bits $P_1$ and $P_2$ in the two lowest-order bit positions as in D-mode.

Figure 7:
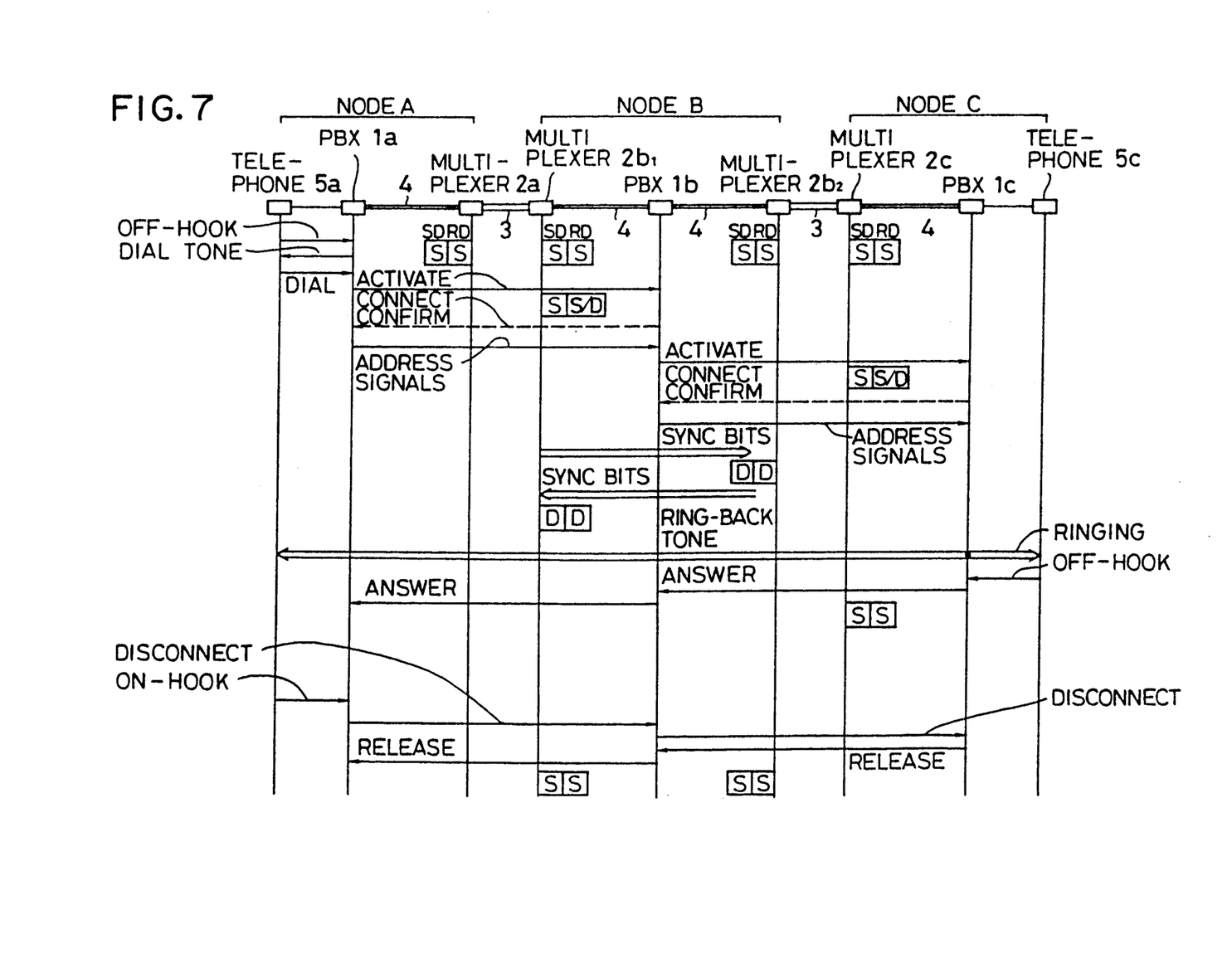
FIG. 7 is a sequence diagram showing the operation of the embodiment illustrated in FIG. 6.

Referring to FIG. 7, this embodiment operates like the first embodiment except that when the multimedia multiplexers $2b_1$ and $2c$ detect activating signals, they change from S-mode to S/D-mode, instead of D-mode, for receiving.

At node B, the multimedia multiplexer $2b_1$ substitutes synchronizing bits into the receive data it transmits to the digital PBX 1b. The multimedia multiplexer $2b_2$ recognizes the synchronizing bit pattern and changes to D-mode for both sending and receiving. The multimedia multiplexer $2b_1$ then recognizes the synchronizing bit pattern from the multimedia multiplexer $2b_2$ and likewise changes to D-mode for both sending and receiving.

At node C, during the interval from activation until the telephone set 5c goes off-hook and the digital PBX 1c sends an answer signal, the multimedia multiplexer 2c gives the digital PBX 1c decompressed PCM audio data in which the two lowest-order bits have been changed to synchronizing bits. Thus at the beginning of the call, the called party at the telephone set 5c may hear an interval of audio distortion, but this interval is brief and the distortion so slight as to be virtually undetectable.

Further description of the operation of this embodiment will be omitted, the details being identical to FIG. 3.

Figure 8:
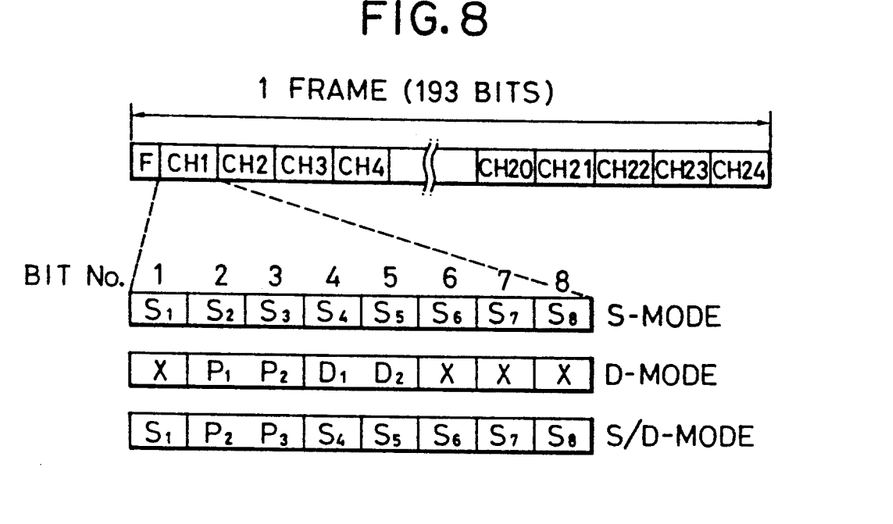
FIG. 8 is a frame diagram illustrating another embodiment for the T1 interface.

Referring to FIG. 8, the same concept is applicable when the T1 format is used. In this fifth embodiment, in S/D-mode the multimedia multiplexers substitute synchronizing bits $P_1$ and $P_2$ for the second and third bits of the decompressed PCM audio data. Distortion heard by the called party at the beginning of the call is still negligibly small.

Since the lowest-order bit ($S_1$) is left unaltered, signaling information is transmitted correctly by bit stealing even when the receiving multimedia multiplexer operates in S/D-mode. The transition from S-mode to S/D-mode can thus take place upon detection of the activating signals, as shown in FIG. 7. Moreover, the possibility of accidental disconnection due to dummy bits being mistaken for a disconnect signal at the beginning of a call is eliminated.

Figure 9:
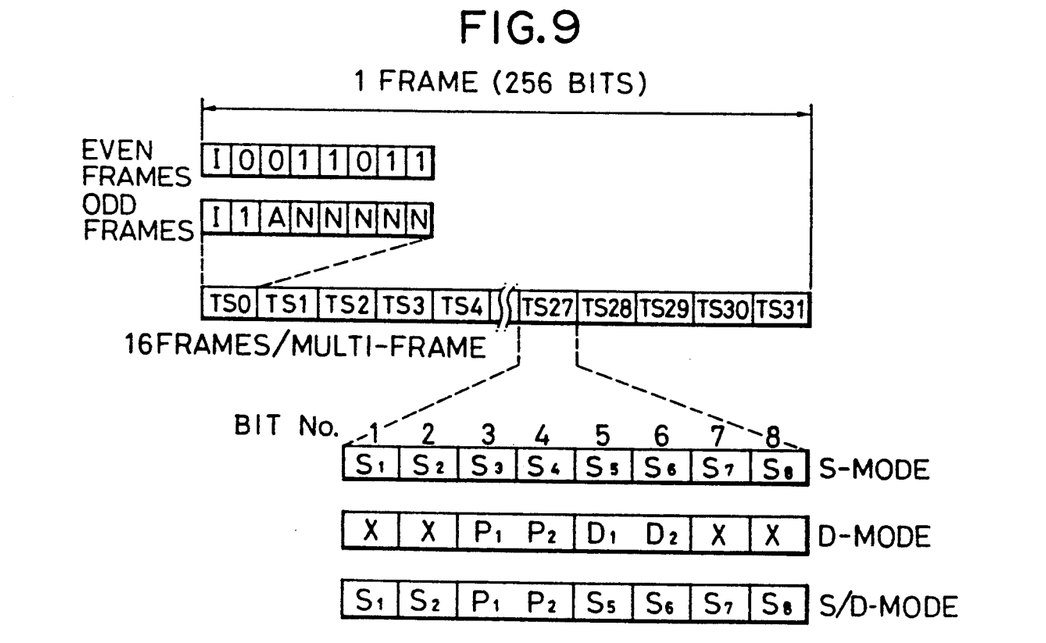
FIG. 9 is a frame diagram illustrating another embodiment for the CEPT interface.

Referring to FIG. 9, the S/D-mode can also be advantageously used with the CEPT format, by substituting synchronizing bits $P_1$ and $P_2$ for the third and fourth bits of the decompressed PCM audio data. In this sixth embodiment audio distortion at the instant when the called party goes off-hook will be somewhat greater than in the fourth embodiment in FIG. 6, although still much less noticeable than the noise generated by the D-mode of the third embodiment in FIG. 5. Accidental disconnection at the beginning of a call is prevented as in the fifth embodiment.

Figure 10:
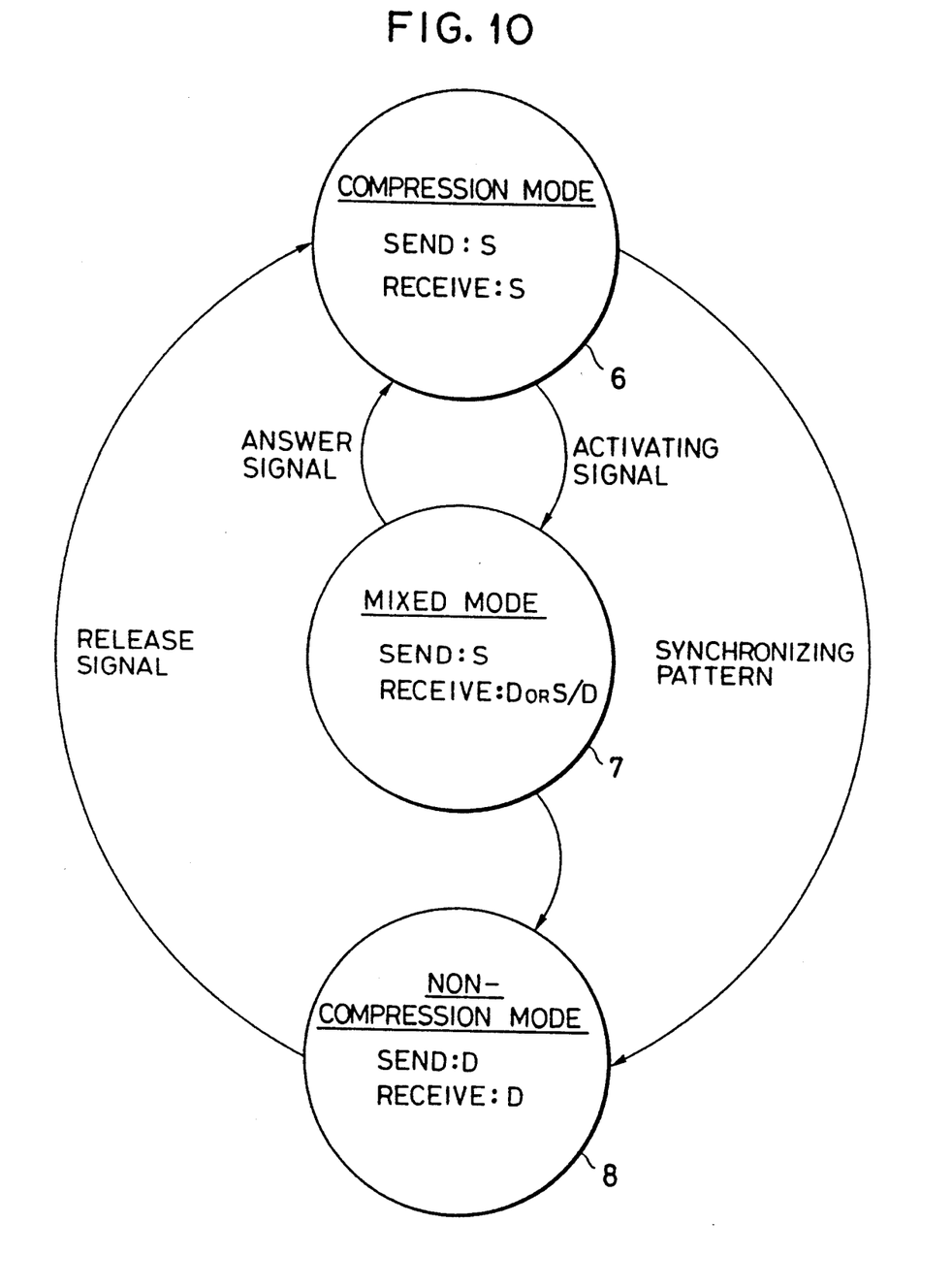
FIG. 10 is a mode transition diagram illustrating mode transitions of the multimedia multiplexers according to the invention.

FIG. 10 summarizes the mode transitions of the multimedia multiplexers in the preceding embodiments. The symbols S, D, and S/D have the same meanings as in FIGS. 2 to 9. A multimedia multiplexer is always in one of three modes: a compression mode 6 in which it compresses send data and decompresses receive data; a mixed mode 7 in which it compresses send data and adds synchronizing bits to receive data, either with (S/D) or without (D) decompression; or a non-compression mode 8 in which it does not compress or decompress data.

In the compression mode 6, reception of an activating signal from a digital communication line 3 causes a transition to the mixed mode 7. Detection of the synchronizing bit pattern in send data causes a transition to the non-compression mode 8.

In the mixed mode 7, detection of the synchronizing bit pattern causes a transition to the non-compression mode 8. Detection of an answer signal causes a transition to the compression mode 6.

In the non-compression mode 8, detection of a release signal causes a transition to the compression mode 6.

The foregoing embodiments do not exhaust the scope of the invention; they only illustrate its application to three representative interface formats. It will be obvious to those skilled in the art that the invention can be applied to any network that uses standard signaling for call setup and termination and employs compression and decompression of digital audio signals, or of other types of digital signals.

What is claimed is:

1. A method for transmitting digital data between a digital private branch exchange PBX and a digital communication line, comprising the steps of:
 (a) obtaining send data from said digital PBX to be transmitted on said digital communication line and determining whether a certain pattern of synchronizing bits is contained in said send data;

(b) transmitting selected information bits of said send data on said digital communication line without compression if said certain pattern of synchronizing bits is determined to be contained in said send data, and compressing said send data and transmitting the compressed send data on said digital communication line if said certain pattern of synchronizing bits is determined to be not contained in said send data;

(c) obtaining receive data from said digital communication line to be sent to said digital PBX, adding said certain pattern of synchronizing bits to said receive data, and transmitting said receive data containing said certain pattern of synchronizing bits to said digital PBX, when said certain pattern of synchronizing bits has been determined to be contained in said send data obtained from said digital PBX; and (d) obtaining receive data from said digital communication line to be sent to said digital PBX, decompressing said receive data, and transmitting said decompressed receive data to said digital PBX, when said certain pattern of synchronizing bits has been determined to be not contained in said send data obtained from said digital PBX.

2. The method of claim 1, further comprising the steps of:
checking for an answer signal from said digital PBX; and
if said answer signal is detected, switching to a compression mode of operation for transmitting send data from said digital PBX to said digital communication line with compression, and transmitting receive data from said digital communication line to said digital PBX with decompression.

3. The method of claim 1, wherein step (c) is performed without decompression of said receive data.

4. The method of claim 1, wherein step (c) is performed after decompression of said receive data, said pattern of synchronizing bits being substituted for certain bits of said receive data after decompression.

5. The method of claim 1, wherein step (c) is performed in response to an activating signal received from said digital communication line.

6. The method of claim 1, wherein a compression mode of operation, wherein send data is compressed and receive data is decompressed, is used prior to step (a).

7. The method of claim 6, further comprising the steps of:
checking for a release signal from either of said digital private branch exchange and said digital communication line; and
switching to said compression mode of operation when said release signal is detected.

8. The method of claim 1, wherein said pattern of synchronizing bits is added at lowest-order bit positions of said receive data which are not used for signaling.

9. The method of claim 1, wherein said send data and said receive data are transmitted to and from said digital private branch exchange in eight-bit time slots.

10. The method of claim 9, wherein:
in step (c), said synchronizing bits are added at first and second bit positions in said time slots; and
in a non-compression mode of operation, each time slot comprises two synchronizing bits, followed by two data bits, followed by four dummy bits.

11. The method of claim 9, wherein:
in step (c), said synchronizing bits are added at second and third bit positions in said time slots; and
in a non-compression mode of operation, each time slot comprises one dummy bit, followed by two synchronizing bits, followed by two data bits, followed by three dummy bits.

12. The method of claim 9, wherein:
in step (c), said synchronizing bits are added at third and fourth bit positions in said time slots; and
in a non-compression mode of operation, each time slot comprises two dummy bits, followed by two synchronizing bits, followed by two data bits, followed by two dummy bits.

13. The method of claim 1, wherein said send data and said receive data comprise audio data encoded by pulse-code modulation.

* * * * *

UNITED STATES PATENT AND TRADEMARK OFFICE
CERTIFICATE OF CORRECTION

PATENT NO. : 5,297,147
DATED : March 22, 1994
INVENTOR(S) : Kiyoshi Shimokasa

It is certified that error appears in the above-identified patent and that said Letters Patent is hereby corrected as shown below:

Col. 6, line 63, "PBXx" should be --PBXs--.

Col. 8, line 63, "PBX" should be --, PBX,--.

Signed and Sealed this

Thirtieth Day of August, 1994

Attest:

BRUCE LEHMAN

Attesting Officer         Commissioner of Patents and Trademarks